United States Patent [19]

Hatano et al.

[11] Patent Number: 4,532,514
[45] Date of Patent: Jul. 30, 1985

[54] COURSE GUIDANCE SYSTEM WITH SPEEDED-UP DISPLAY FUNCTION

[75] Inventors: Itaru Hatano, Morioka; Kenji Takahashi; Shigeru Hirosawa, both of Takizawa; Mikio Kanda, Tamayama; Shinichiro Yasui, Tokyo; Akira Ichikawa, Wakoh; Teruo Mimori; Toshio Sasaki, both of Yokohama; Tadashi Mukai, Tokyo; Thuneo Takahashi, Thurugashima, all of Japan

[73] Assignee: Alps Electric Co., Ltd., Japan

[21] Appl. No.: 407,999

[22] Filed: Aug. 13, 1982

[30] Foreign Application Priority Data

Aug. 14, 1981 [JP] Japan .................. 56-127398

[51] Int. Cl.³ ........................................ G08G 1/12
[52] U.S. Cl. ........................ 340/995; 358/140; 364/424; 364/460
[58] Field of Search ............ 340/990, 995, 750, 798, 340/799; 358/105, 140, 93, 206, 103; 364/424, 460, 444, 448, 449; 353/12

[56] References Cited

U.S. PATENT DOCUMENTS

| | | | |
|---|---|---|---|
| 3,457,369 | 7/1969 | Davies | 358/140 |
| 3,688,252 | 8/1972 | Thompson | 340/995 |
| 3,899,662 | 8/1975 | Kreeger | 340/745 |
| 3,899,769 | 8/1975 | Honore | 340/995 |
| 4,084,241 | 4/1978 | Tsumura | 340/995 |
| 4,386,367 | 5/1983 | Peterson | 358/140 |

Primary Examiner—John W. Caldwell, Sr.
Assistant Examiner—Michael F. Heim
Attorney, Agent, or Firm—Guy W. Shoup

[57] ABSTRACT

A course guidance system includes a direction sensor and a speed sensor both fitted to a moving body, a display mounted in the moving body and a map displayed in a manner corresponding to the display surface of the display and in which the present position of the moving body is derived by the direction sensor and the speed sensor and is plotted on the display in a manner corresponding to the map. The improvement comprises a locus memory for sequentially storing an X component value and a Y component value of the driving position based on a predetermined driving distance obtained from the speed sensor and on the driving position obtained from the direction sensor, a locus display memory for storing data in a manner corresponding to the display surface of the display, the data being obtained by reading the contents of the locus memory in a manner corresponding to the scale of reduction of the map, and a display for plotting the driving locus of the moving body on the display surface based on the contents of the locus display memory, wherein the data to be read when the contents of the locus memory is transferred to the locus display memory are divided into a plurality of groups each consisting of a data line to be read at a predetermined interval which are sequentially read and transferred, and the plotted line of the driving locus to be displayed is displayed sequentially and progressively from a rough display to a dense display.

6 Claims, 8 Drawing Figures

Fig. 3 (A)
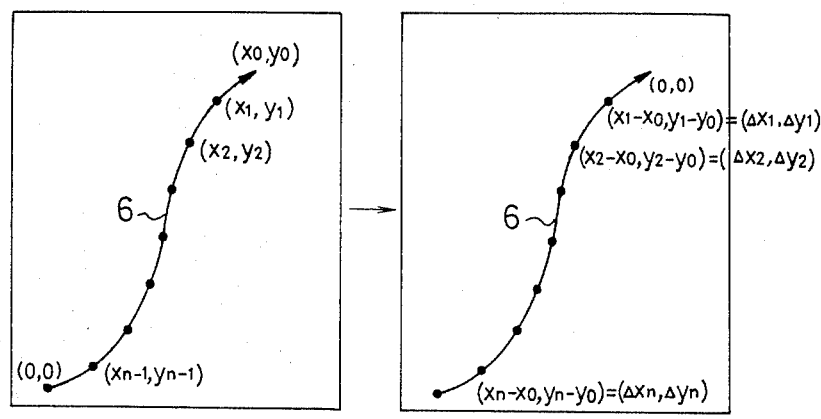
Fig. 3 (B)
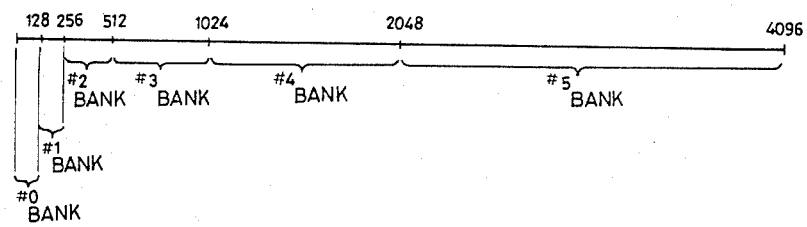
Fig. 3(C)
| BANK \ sampling mode | 1 | 2 | 4 | 8 | 16 | 32 |
|---|---|---|---|---|---|---|
| #0 BANK | 128 / 1 | 64 / 2 | 32 / 4 | 16 / 8 | 8 / 16 | 4 / 32 |
| #1 BANK |  | 64 / 1 | 32 / 2 | 16 / 4 | 8 / 8 | 4 / 16 |
| #2 BANK |  |  | 64 / 1 | 32 / 2 | 16 / 4 | 8 / 8 |
| #3 BANK |  |  |  | 64 / 1 | 32 / 2 | 16 / 4 |
| #4 BANK |  |  |  |  | 64 / 1 | 32 / 2 |
| #5 BANK |  |  |  |  |  | 64 / 1 |

COURSE GUIDANCE SYSTEM WITH SPEEDED-UP DISPLAY FUNCTION

BACKGROUND OF THE INVENTION

This invention relates to a course guidance system having a rough-and-dense locus display mechanism. In a course guidance system which includes an electronic display disposed, for example, at the driver's seat of a car, a map adapted to the display surface of the display and a direction sensor and a speed sensor mounted in the car for deriving the present position of the car and plotting it on the display so as to guide the course the car is driven in association with the map, the present invention relates to a course guidance system for a car having a rough-and-dense locus display mechanism in which, when the driving locus of the car consisting of a plotted line displayed on the display, for example, is moved linearly or rotated, the plotted points of the driving locus are jump-displayed at predetermined intervals so that the display of the plotted line progressively changes from rough to dense and the driving locus can be displayed visibly at a far higher speed than when it is displayed dense from the beginning.

As micro-computers have become readily available in recent years, driving navigators for cars, for example, have been developed. As one of the navigators of this kind, a course driving system has been developed which includes a direction sensor and a speed sensor mounted in the car for deriving the position of the car and a CRT display for plotting the driving locus and in which a map is associated with the display so that the plot of the driving locus extends along the roads on the map.

When this system is used, linear motion or rotation of the locus display is effected through a keyboard operation in order to make the driving locus on the display accurately correspond to the map. In this case, the driving locus is expressed as a continuous line of an extremely great number of points representing transient driving positions from the past to a given moment in accordance with the distance the car was driven detected by the speed sensor. If this plotted line is continuously processed one dot at a time and displayed, a relatively long period of time is required before the entire locus is displayed. If linear motion or rotation of the locus is effected, a long time is necessary in order to see to what extent the locus is changed, resulting in the drawback that correspondence to the map can not be made quickly. Especially when linear motion or the like of the driving locus is made while the car is driven at a high speed, high speed processing is essential.

The present invention is primarily directed to meet this requirement. The present invention will now be described in detail with reference to the accompanying drawings.

BRIEF DESCRIPTION OF THE DRAWINGS

FIG. 3(A) is a diagram for illustrating the operational steps of the memory convertor;

FIG. 3(B) is a diagram for defining the relationship between the locus memory banks and coordinate data;

FIG. 3(C) is a diagram useful for explaining the storage mode and reading mode of the position data to be stored in the locus memory shown in FIG. 2;

DESCRIPTION OF THE PREFERRED EMBODIMENTS

Figure 1:
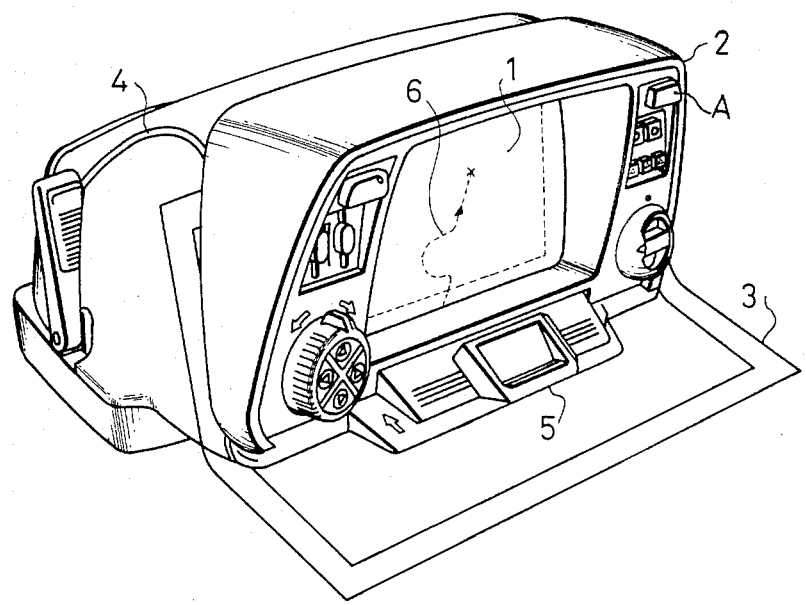
FIG. 1 is a perspective view of the course guidance system constructed in one unit in accordance with an embodiment of the present invention.

In FIG. 1, reference numeral 1 represents the display surface of a cathode ray tube display; 2 is a shaded portion; 3 is a map which is printed on a transparent film, for example; 4 is a map insertion guide groove; 5 is a map fixing member; and 6 is the driving locus.

As will be described later with reference to FIG. 2, a direction sensor and a speed sensor are mounted in the car for deriving the changing position of the car from a starting point, for example, and to plot the driving locus 6 on the display surface of the CRT display. On the other hand, the map 3 printed on transparent film is inserted from the foreground of the drawing along the map insertion guide groove 4 so that the map is positioned on the front surface of the display surface 1 and fixed by the fixing member 5. Needless to say, consideration is made to make the driving locus 6 match with the reduced scale of the map. The driving locus 6 sequentially appears along a desired driving route on the map and the driver or passenger of the car determine the present driving position, the driving direction, and so forth from the relation between the driving locus 6 and the map.

Figure 2:
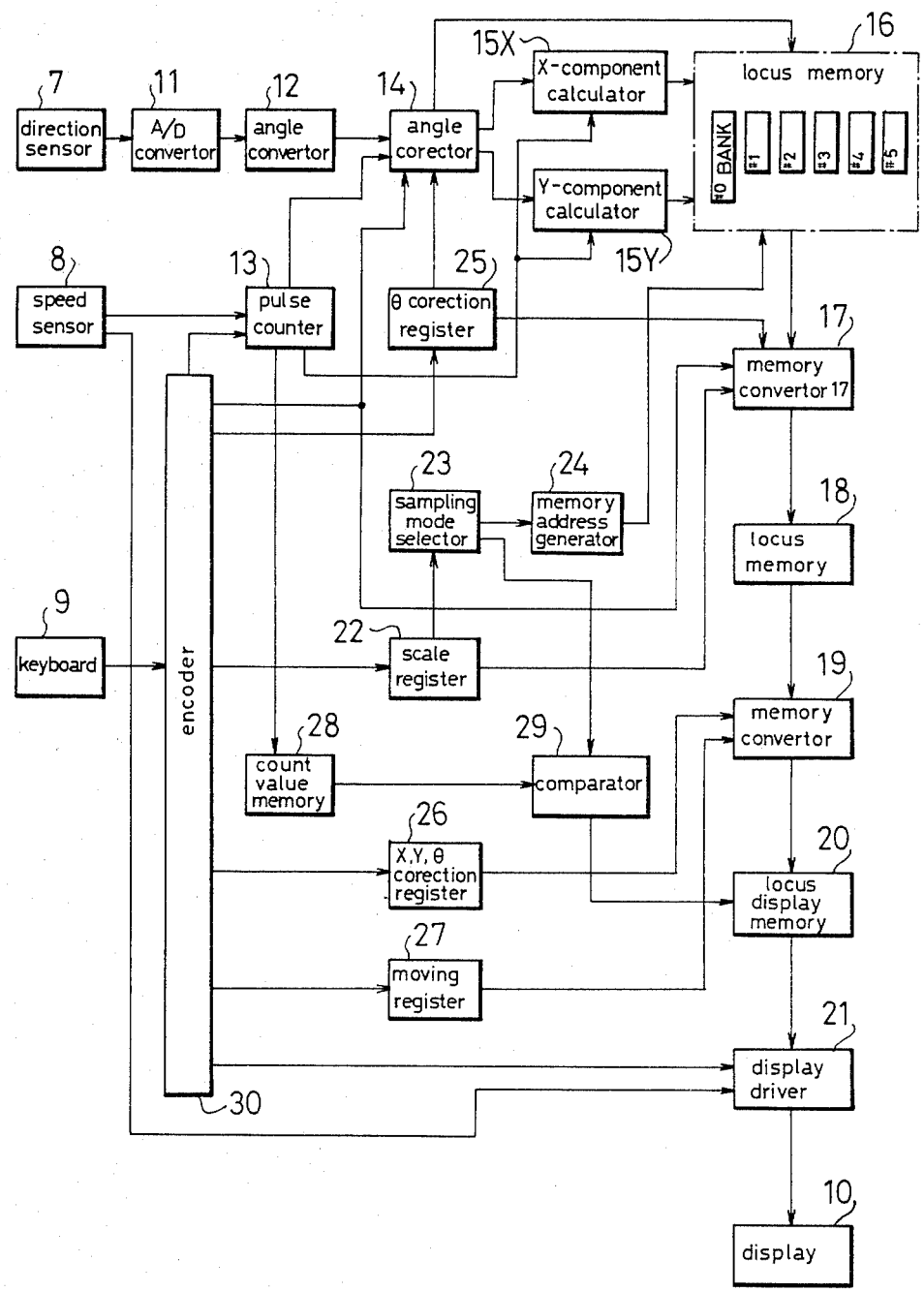
FIG. 2 is a block diagram of the embodiment of the present invention.

FIG. 2 is a block diagram showing an embodiment of the present invention as a whole. Reference numeral 7 represents the abovementioned direction sensor which detects the driving direction of the car in relation to a given reference direction. Reference numeral 8 represents the speed sensor which generates clock pulses in response to the number of revolutions of the wheels, for example; Reference numeral 9 represents a keyboard which includes a variety of keys disposed on the front surface of the shaded portion shown in FIG. 1 and on the side surface of the display main body. Reference numeral 10 represents the display.

The direction data from the direction sensor 7 is converted into digital signals by an A/D convertor 11, and into angle data by an angle convertor 12. On the other hand, the clock pulses from the speed sensor 8 are counted by a pulse counter 13 and a sample clock signal is generated whenever the wheel rotates, for example, 10 revolutions. Whenever the sample clock signal is generated, the angle data from the angle convertor 12 is applied to an X component calculator 15X and to a Y component calculator 15Y through an angle corrector 14. The X component calculator 15X derives the movement in the X-direction with the direction (north) being the reference, for instance, adds it to the accumulated value of movements along the X axis up to that moment and calculates and applies the coordinates of the present position on the X axis to the locus memory 16 so that it is stored in the #0 bank of the locus memory 16. Similarly, the Y component calculator 15Y derives the movement in the Y-direction, adds it to the accumulated value of movements along the Y axis up to that moment, and calculates and applies the coordinates of the present position on the Y axis to the locus memory 16 so that it is stored in the #0 bank of the memory. For example, the coordinate values at the present position when the coordinates of the starting point is (0, 0) are calculated and is supplied to the locus memory 16.

The contents of the orbit memory 16 is read out to be transferred to a locus memory 18, is subjected to a predetermined conversion in a memory convertor 17, and is stored in locus memory 18. In this case, conversion is effected in a manner corresponding to the reduced scale of the map, which will be described later in detail with reference to FIG. 3. The contents of the memory 18 is read out to be transferred to a locus display memory 20, is subjected to predetermined conversion, such as linear motion, in the memory convertor 19 and is then stored in the locus display memory 20. The contents of the locus display memory 20 corresponds to the image figure to be displayed by the display 10, is read out by a display driver 21 and applied to the display 10, thereby providing the driving locus 6 such as shown in FIG. 1. The driving locus 6 is observed through the map printed on a transparent sheet as shown in FIG. 1 and adjusted to correspond to a desired road on the map so as to perform the course guidance.

Reference numeral 22 represents a reduced scale register, to which the reduced scale data of the map that is set as shown in FIG. 1 is set through the keyboard 9. The contents of the register 22 is applied to the memory convertor 17 and is utilized when the contents of locus memory 16 is to be transferred to locus memory 18. The contents of memory 22 is applied to a sampling mode selector 23 and is used for generating addresses by an address generator 24. This procedure will be described later with reference to FIG. 3.

Reference numeral 25 represents a 0 correction register, to which a correction value for correcting the angle of deviation between the driving locus and the map when the car is actually driving on the road is set from the keyboard 9. In transferring the contents of memory 16 to memory 18, the abovementioned angle of deviation is corrected using the correction value which is set so as to correct the angle of deviation in an adjusting mode, such as when the unit shown in FIG. 1 is mounted in the car.

Reference numeral 26 represents an X, Y, θ register, to which correction data is set from the keyboard in order to correct slight deviations between the road on the map and the driving locus 6 under the state in which the map is set such as shown in FIG. 1. This deviation is corrected in the memory convertor 19 when the content of locus memory 18 is transferred to the locus display memory 20.

Reference numeral 27 represents a moving register for linear motion and/or rotation. Data of the amount of movement is set to this register 27 from the keyboard 9 so as to cause linear motion and/or rotation of the driving locus 6 as a whole when the map 3 set as shown in FIG. 1 is replaced by a new map, or the like. This linear motion and/or rotation is effected in memory convertor 19 when the contents of locus memory 18 is transferred to locus display memory 20.

Reference numeral 28 represents a count value memory, to which the contents of the pulse counter 13 when the car passes by, for example, a railroad crossing or bridge, is set. This memory is used to plot the position the landmark was passed on the display surface of the display 10 in a display mode different from that of the driving locus 6. In other words, it is used in such a manner as to leave a memory mark with brighter dots than the driving locus 6 and to assist location with respect to the map. Reference numeral 29 represents a comparator which is used for writing the mark on the locus display memory 20 in response to the points corresponding to the contents of the memory 28. Reference numeral 30 represents an encoder for generating a code corresponding to the data input from the keyboard 9.

The driver 21 shown in FIG. 2 is equipped with the display suppress function of receiving the suppress mode data from the encoder 30 and the driving data from the speed sensor 8 and suppressing the display on the display 10 while driving the car lest the driver or a passenger of the car should be distracted by the display 10 while driving.

The principal processing in each of the above-mentioned X component calculator 15X, Y component calculator 15Y, locus memory 16, memory convertor 17 and locus memory 18 will be described in detail with reference to FIG. 3.

As described already, the X and Y component calculators 15X and 15Y calculate the coordinates $(x_i, y_i)$ of the driving position at the time corresponding to each sample clock signal with the coordinates of the starting position being, for example, (0, 0). The result is stored in the locus memory 16. This mode may be considered as one shown on the left side of FIG. 3(A) in conjunction with the driving locus 6. In other words, the coordinates $(x_{n-1}, y_{n-1}), \ldots, (x_2, y_2), (x_1, y_1), (x_o, y_o)$ from the coordinates (0, 0) of the starting point are stored. The locus memory 16 is equipped with the #0 bank for 128 words and the #1 through #5 banks for 64 words each. 128 coordinates up to $(x_{127}, y_{127})$ from the coordinates $(x_o, y_o)$ as the starting point are sequentially stored in the #0 bank in the push-down system, for example. Every other coordinate data overflowing from the #0 bank is extracted and stored data in the #1 bank in the push-down system, for example, and every other coordinate data overflowing from the #1 bank is extracted and stored, in the #2 bank in the push-down system. The same procedure is effected in the #3 through #5 banks.

In other words, as shown in FIG. 3(B), 128 coordinate data from the present point $(x_o, y_o)$ are stored for every sample clock signal in the #0 bank, and 64 coordinate data from 129th to 256th from the present point $(x_o, y_o)$ are stored for every other sample clocks signal in the #1 bank. Similarly, 64 coordinate data from the 513rd to 1024th are stored for every four sample clocks signals in the #2 bank. One coordinate data is stored for every 8 sample clocks signals in the #3 bank, for every 16 sample clocks signals in the #4 bank and for every 32 sample clocks signals in the #5 bank, respectively.

If the map is used in the abovementioned manner, the driving locus on the display 10 should be displayed in a form corresponding to the scale of reduction of the map. In displaying the driving locus 6 in accordance with a map having the smallest scale of reduction, therefore, the coordinate data of the #0 bank are sequentially read out with the sampling mode "1" (or without sampling) as shown in FIG. 3(C) to form a driving locus consisting of 128 dots. When a map having a reduced scale ratio of about 2 times is used, 64 coordinate data are read out from the #0 bank with the sampling mode "2" (or every other data) while 64 coordinate data are read out from the #1 bank with the sampling mode "1" to form a driving locus consisting of a total of 128 dots.

Similarly, when a map having a reduced scale of about 32 times is used, the coordinate data are read out every 32 data from the #0 bank, every 16 data from the #1 bank, every 8 data from the #2 bank, every four data from the #3 bank, every other data from the #4 bank and all the data from the #5 bank, thereby forming a driving locus consisting of a total of 128 dots.

In transferring the contents of locus memory 16 to locus memory 18, the scale of reduction data is set to the scale register 22 in accordance with the abovementioned scale ratio, the abovementioned sampling mode is determined and the memory addresses are generated in accordance with the scale ratio. The locus memory 16 is accessed based on these addresses. In the interim, corrections based on the contents of the correction register 25 is made, though its explanation in conjunction with FIG. 2 is not given here. However, in extracting and transferring the 128 dots from the contents of memory 16 to memory 18, the convertor 17 uses the present coordinate position as the origin (0, 0) and converts in such a manner that the previous coordinate position is $(x_1-x_o, y_1-y_o)$, the coordinate position preceding the former is $(x_2-x_o, y_2-y_o)$, . . . and so forth. After conversion is thus made, the contents of memory 16 is transferred to memory 18. This processing makes it possible to carry out processing with the present position as the reference and to make various adjustments easily.

The course guidance system for automobiles, to which an embodiment of the present invention is directed, has the construction and function substantially as described above. The number of points displaying the driving locus 6 is very large. Especially when the driving locus 6 is linearly moved or rotated, or when the scale of reduction of the map is changed, a considerable amount of time for processing is necessary to display the whole driving locus.

However, when positioning to the map is effected by linear motion of the driving locus 6 as described above, for example, the driving locus 6 need not necessarily be displayed in the accurate continuously plotted line from the beginning. Rapid positioning to the map is possible if the user can see substantially which points the driving locus 6 as a whole passes through. On the basis of this concept, the present invention processes the locus data on the locus memories 16 and 18 in the following manner and displays the driving locus 6.

In reading the locus data from the orbit memory 16 and effecting the predetermined conversion in the memory convertor 17, the data are not read sequentially from the beginning but are jump-extracted at predetermined intervals. After processing is completed to the end, processing is then done again from the beginning and the data situated between the data extracted previously are extracted at the same interval. This processing is similarly repeated for all the locus data, thereby finally displaying the driving locus 6 as the continuous plotted line.

Figure 4:
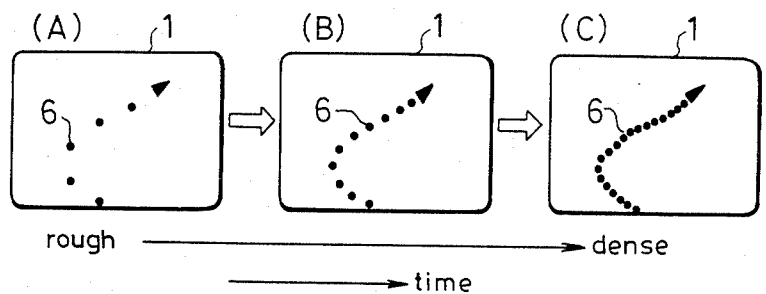
FIG. 4 is a schematic view useful for explaining the locus display mode when the present invention is employed.

When the processing is carried out in this manner, the driving locus 6 can be displayed on the display surface of the display 10 over time as shown in FIGS. 4(A) through 4(C), for example. In other words, the plot of the driving locus 6 is displayed roughly at first as shown in FIG. 4(A), the intermediate parts of the plot are then displayed as shown in FIG. 4(B) and the driving locus 6 is gradually displayed densely as shown in FIG. 4(C).

Figure 5:
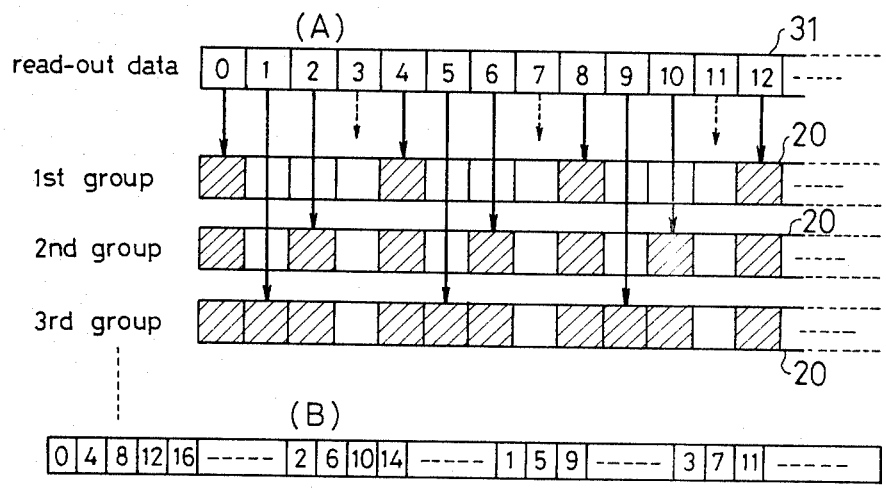
FIG. 5 is a diagram useful for explaining the concept in the memory conversion processing in accordance with the embodiment of the present invention.
Figure 6:
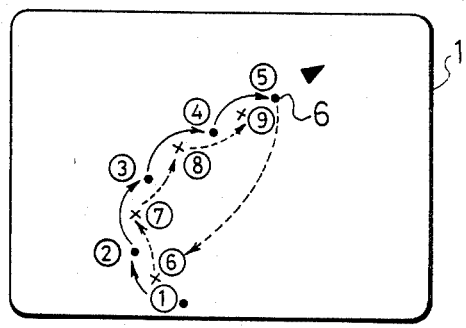
FIG. 6 is a schematic view useful for explaining the display mode in accordance with the embodiment of the present invention.

The sequence of the data that are read by the memory convertor 17 can be explained more definitely as follows. In FIG. 5(A), the locus data line 31 conceptually represents data which are to be taken from the locus memory 16 in the sequence of time from the past to the present. However, this is the data line in considering the scale of the map or the like but does not represent the physical storing position on the locus memory 16. If the plot interval is "4", for example, the orbit data line 31 is conceptually divided into four data groups, in which the first group consists of those data whose sequence can be divided by "4", the second consists of those data whose sequence gives a remainder "2" when divided by "4", the third consists of those data whose sequence gives a remainder "1" when divided by "2" and the fourth consists of those data whose sequence gives a remainder "3" when divided by "4". The first data group are taken from locus memory 16, are subjected to the predetermined memory conversion and are then stored in the locus display memory 20. The second, third and fourth groups are sequentially similarly processed. As a result, the locus data line 31 is processed in the sequence shown in FIG. 5(B). Accordingly, as shown in FIG. 6, the driving locus 6 is displayed on the display 10 in such a fashion that the points from 1 to 5 are first displayed, and then 6 to 9 between the former in a progressively denser form.

In accordance with the abovementioned processing, if the extraction interval of the points is N and the overall image of the driving locus 6 can be substantially grasped by the processing of the kth group, processing such as positioning to the map can be made in a time of about k/N in comparison with the case in which the points are displayed continuously densely from the beginning.

As described above, the present invention makes it possible for the driver of the car to quickly see the whole image of the driving locus, however great the number of points representing the driving locus may be.

What is claimed is:

1. In a course guidance system which includes a direction sensor and a speed sensor both fitted to a moving body, a display mounted in said moving body and a map displayed on the display surface of said display and in which the existing position of said moving body is derived by said direction sensor in cooperation with said speed sensor and is plotted on said display in such a manner as to correspond to said map, the improvement comprising: a locus memory for sequentially storing an X component value and a Y component value of the driving position based a predetermined driving distance obtained from said speed sensor and on the driving position obtained from said direction sensor; a locus display memory for storing data in such a manner as to correspond to the display surface of said display, said data being obtained by reading the content of said locus memory in a manner responsive to the scale of reduction of said map; and a display for plotting the driving locus of said moving body on the display surface based on the contents of said locus display memory; wherein the data to be read when the contents of said locus memory is transferred to said locus display memory are divided into a plurality of groups each consisting of a data line to be read at a predetermined interval and are sequentially read and transferred to the display, and the plotted line of the driving locus is displayed sequentially and progressively from a rough display to a dense display.

2. The course guidance system as defined in claim 1 wherein said display consists of a cathode ray tube.

3. The course guidance system as defined in claim 1 wherein said map is spread on the display surface of said display and is printed on a transparent film.

4. The course guidance system as defined in claim 1 which further includes a memory convertor for reading out the content of said locus memory, converting the data thus read out in accordance with the scale of reduction of said map and supplying the locus data to said locus display memory, and a memory convertor for converting the data read out from said locus memory in accordance with a specified linear or rotational orientation of said map, and supplying the locus data thus obtained to said locus display memory.

5. The course guidance system as defined in claim 1 which further includes a memory convertor for receiving correction data from a keyboard operation, applying the correction data to the contents read out from said locus memory to correct slight deviations between said map and the driving locus, and supplying the corrected locus data to said locus display memory.

6. The course guidance system as defined in claim 1 which further includes a memory convertor for correcting the transferred contents when the contents of said locus memory is transferred to said locus display memory so that offset quantities are individually added to the X coordinate components and Y coordinate components of the contents of said locus memory, and the transfer contents is thereafter transferred to said locus display memory.

* * * * *

UNITED STATES PATENT AND TRADEMARK OFFICE
CERTIFICATE OF CORRECTION

PATENT NO. : 4,532,514

DATED : July 30, 1985

INVENTOR(S) : Itaru Hatano, Kenji Takahashi, Shigeru Hirosawa, Mikio Kanda, Shinichiro Yasui, Akira Ichikawa, Teruo Mimori, Toshio Sasaki, Tadashi Mukai, Thuneo Takahashi It is certified that error appears in the above—identified patent and that said Letters Patent is hereby corrected as shown below:

Title page, Item [73] should read as follows:

"Assignees: Alps Electric Co., Ltd. and Honda Motor Co." (part interest)

Signed and Sealed this

Twentieth Day of October, 1987

Attest:

DONALD J. QUIGG

Attesting Officer

Commissioner of Patents and Trademarks